US009950553B2

(12) United States Patent
Miao et al.

(10) Patent No.: US 9,950,553 B2
(45) Date of Patent: Apr. 24, 2018

(54) PROCESS OF FORMING AN IDENTIFICATION MARKING, AND AN IDENTIFICATION MARKING FORMED BY WAY OF SUCH A PROCESS

(71) Applicant: Master Dynamic Limited, Shatin, New Territories (HK)

(72) Inventors: Zhuonan Miao, Shatin (HK); Yingnan Wang, Shatin (HK); Ching Tom Kong, Pat Heung (HK)

(73) Assignee: Master Dynamic Limited (HK)

( * ) Notice: Subject to any disclaimer, the term of this patent is extended or adjusted under 35 U.S.C. 154(b) by 0 days.

(21) Appl. No.: 15/616,600

(22) Filed: Jun. 7, 2017

(65) Prior Publication Data

US 2017/0355215 A1 Dec. 14, 2017

(30) Foreign Application Priority Data

Jun. 10, 2016 (HK) .................. 16106707.3

(51) Int. Cl.
*B41M 3/14* (2006.01)
*B42D 25/328* (2014.01)
(Continued)

(52) U.S. Cl.
CPC ........ *B42D 25/328* (2014.10); *B23K 26/0057* (2013.01); *B41M 5/262* (2013.01); *B41M 5/267* (2013.01); *B42D 25/435* (2014.10)

(58) Field of Classification Search
CPC ... B23K 26/0057; B41M 5/262; B41M 5/267; B41M 5/26; B41M 3/14; B42D 25/328;
(Continued)

(56) References Cited

U.S. PATENT DOCUMENTS 4,641,017 A 2/1987 Lopata
5,206,946 A * 4/1993 Brunk ................ G06F 13/4045
710/2
(Continued)

FOREIGN PATENT DOCUMENTS

CN 2426853 Y 4/2001
GB 2247677 A 3/1992
(Continued)

OTHER PUBLICATIONS

Jia, Qifeng, Authorized Officer, State Intellectual Property Office of the P.R. China, "International Search Report and Written Opinion" in connection with related International Application No. PCT/CN2017/087343, dated Sep. 15, 2017, 13 pages.

(Continued)

*Primary Examiner* — Huan Tran
(74) *Attorney, Agent, or Firm* — Kolisch Hartwell, P.C.

(57) ABSTRACT

A process of forming an identification marking within article formed from an at least partially optically transparent material for identification and validation, said process including the steps of (i) forming an indicia with an at least partially optically transparent material by way of subsurface laser engraving (SSLE); and (ii) forming a plurality of defects within or adjacent indicia within said at least partially optically transparent material resultant of the step of forming the indicia and from localized heating and irregularities in said at least partially optically transparent material, wherein said plurality of defects forms said identification marking.

20 Claims, 7 Drawing Sheets (51) Int. Cl.
*B42D 25/435* (2014.01)
*B23K 26/00* (2014.01)
*B41M 5/26* (2006.01)

(58) Field of Classification Search
CPC ...... B42D 25/435; B42D 25/29; B42D 25/00; B42D 25/23; B42D 25/41
See application file for complete search history.

(56) References Cited

U.S. PATENT DOCUMENTS

| | | | |
|---|---|---|---|
| 5,886,318 A | | 3/1999 | Vasiliev et al. |
| 6,760,472 B1* | | 7/2004 | Takeda ............... G06K 7/10544 235/380 |
| 7,438,237 B2* | | 10/2008 | Bourrieres ............ A61B 5/117 235/494 |
| 9,475,149 B1* | | 10/2016 | Testrake ........... B29D 11/00317 |
| 2004/0179267 A1 | | 9/2004 | Moon et al. |
| 2005/0179253 A1 | | 8/2005 | Rivera et al. |
| 2005/0241203 A1 | | 11/2005 | Lizotte et al. |
| 2006/0196858 A1 | | 9/2006 | Barron et al. |
| 2012/0235047 A1* | | 9/2012 | Lewellen ............... A61B 6/037 250/366 |

FOREIGN PATENT DOCUMENTS

| | | |
|---|---|---|
| JP | 2000235636 A | 8/2000 |
| WO | 2012162057 A2 | 11/2012 |

OTHER PUBLICATIONS

United Kingdom Intellectual Property Office, "Search Report Under Section 72 of the Hong Kong Patents (General) Rules", in connection with related Hong Kong Application No. H600108, dated Oct. 6, 2016, 3 pages.

* cited by examiner

PROCESS OF FORMING AN IDENTIFICATION MARKING, AND AN IDENTIFICATION MARKING FORMED BY WAY OF SUCH A PROCESS

TECHNICAL FIELD

The present invention provides a process of forming an identification marking and an identification marking formed by way of such a process. More particularly, the present invention provides a process for forming an identification marking within an at least partially optically transparent material.

BACKGROUND OF THE INVENTION

Identification and authentication of articles is required for numerous purposes, such as anti-counterfeiting protection, identification of stolen goods, proof of original, determining impropriety, ensuring legitimacy and originality of goods being serviced and the like. Identification and authentication of goods and articles is also critical also for health and safety.

Such goods and articles for which identification and authentication are required include those such as jewellery, artworks, antiques, artifacts, fashion items, handbags, timepieces, wines and spirits, automobile parts, electrical goods, pharmaceuticals, foodstuffs, credit cards, loyalty cards, identification cards, animals, human beings and the like.

Traditional manners in manners of marking of goods include engraving, serial numbers, batch numbers, manufacturers' labels, tamper proof labels, seals, watermarks, proof tags and the like.

In some cases, a marking may be a unique identifiable mark, or in other cases, the marking may be a batch or brand mark.

Within the art there exist numerous manners in which to mark goods for identification and authentication purposes, such as for example attachment of an adhesive label containing a hologram to an article or an object, which is typically considered complex and difficult to reproduce. Credit cards may also include reflective holographic images, however such images are often rudimentary and may be reproduced by counterfeiters.

Other techniques include attachment of a radio-frequency label (RFID) to the object to be authenticated, which requires the reading thereof by a reader, which then may be validated by way of a validation system.

Unique chemical scents or signatures have also been utilised in the art, so as to provide a unique marking to articles or objections, which requires analysis to validate whether the scent is of the type to which it is purported.

Within the art there exists processes such as that of PCT/FR2001/00322 which describes a reading process for a three-dimensional means of identification containing a mixture of at least two materials that can be distinguished from one another in the form of a transparent matrix containing bubble. The process comprises a step to recognize the heterogeneous internal structure in two dimensions of the means of identification and another step to verify and prove its third dimension characterized by reading and verifying the three-dimensional layout of the bubbles contained in the means of identification. The bubbles include members that had been self-generated during the hardening of the transparent material, by submitting the means of identification successively and immediately, while the means of identification is maintained in a fixed position, to different lightings to determine by a diffuse lighting a random two dimensional pattern of the bubbles thereby allowing them to be read and coded, and to confirm by a direct lighting from the same lighting sources the three dimensional aspect of the identification means. Another such process is that of U.S. Pat. No. 7,438,237 which describes an identification and authentication process that is indirect and does not employ a specific reader, for identifying an object the process. three-dimensional identifier is attached to an object, the identifier presenting three-dimensional heterogeneities distributed in a random manner within a transparent material purporting the identifier difficult or impossible to reproduce. The process uses stereoscopic vision of the human eye to verify a three-dimensional appearance and confirm the authenticity of the three-dimensional identifier, and the identification process or reading is made by visual comparison of a two-dimensional first image of the three-dimensional identifier stored in a database accessible by a network, to the three-dimensional identifier.

OBJECT OF THE INVENTION

It is an object of the present invention to provide an identification marking, which overcomes or ameliorates at least some of the deficiencies as associated with the prior art.

SUMMARY OF THE INVENTION

In a first aspect, the present invention provides a process of forming an identification marking within article formed from an at least partially optically transparent material for identification and validation, said process including the steps of (i) forming an indicia within an at least partially optically transparent material by way of subsurface laser engraving (SSLE); and (ii) forming a plurality of defects within or adjacent said indicia within said at least partially optically transparent material resultant of the step of forming the indicia and from localized heating and irregularities in said at least partially optically transparent material; wherein said plurality of defects forms said identification marking.

The at least partially optically transparent material may be a polymeric material, a crystalline material, or a non-crystalline amorphous solid material such as silicate glass.

In a second aspect, the present invention provides an article including therein an identification marking, wherein the identification marking is formed according to the process of the first aspect.

The article may be a card type article including those selected from the group including an access card, an identification card, a smart card, a credit card or the like.

Alternatively, the article may be an identification device including those selected from the group including an identification tag, a label, a certification tag or the like.

The marking is formed within the body of the article, for example, wherein the article is a vessel, bottle, container or the like.

In a third aspect, the present invention provides a process of validating and authenticating a marking, said process including the steps of (i) acquiring an optical image from an article of a marking formed within the article formed according to the process of the first aspect by way of an optical acquisition device; (ii) comparing the optical image with a pre-acquired optical image of said marking by way of a processor; and (iii) upon the processor determining a correlation between the acquired image of the marking with the pre-acquired optical image of the marketing, the processor provides a signal indicative of authentication of the marking.

In a fourth aspect, the present invention provides a validation system for validating the authenticity of an article, said validation system comprising an reader device acquiring an optical image of a marking from an article, wherein the marking comprises a plurality of defects formed within the article by the process according to the first aspect; a control system in communication with the reader device for receiving a signal from the reader device indicative of the optical image of the marking acquired from the article, said control system including a data store having data indicative of a pre-acquired optical image of the marking; the control system including a processor for processing data received from the reader device and from the data store; and an authentication indication device for providing an indication that the acquired optical image of the marking correlates with the pre-acquired optical image of the marking; wherein upon receipt of said signal from the reader device the processor determines if the acquired optical image correlates with the pre-acquired optical image and in the event of a valid correlation an authentication signal is sent indicative of a correlation from the control system to the authentication indication device.

In a fifth aspect, the present invention provides a process of forming an identifiable marking to an article within an at least partially optically transparent material for identification and validation, said process including the step of (i) forming a covert laser readable (CLR) image with an at least partially optically transparent material by way of subsurface laser engraving (SSLE); wherein the CLR image provides holographic projectable image such that upon a laser light source at an appropriate angle of incidence being applied to a first side of the article and through the at least partially optically transparent material, and the light exiting a second side of the article through the at least partially optically transparent material towards a viewing panel, requisite holographic image is projected on the viewing panel.

The subsurface laser engraving (SSLE) may form a plurality of defects within or adjacent indicia within said at least partially optically transparent material resultant of localized heating and irregularities in said at least partially optically transparent material; and wherein said plurality of defects forms an optically identifiable marking.

In a fifth aspect, the present invention provides an article having an identifiable marking formed according to the process of the fifth aspect.

The article may further include an optically identifiable marking formed according to the fifth aspect.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional figures as follows.

DETAILED DESCRIPTION OF THE PREFERRED EMBODIMENTS

The present invention provides for the formation of a marking within an at least partially optically transparent material, by way of subsurface laser engraving (SSLE).

In accordance with the present invention in a first aspect, a unique an irreproducible marking within an at least partially optically transparent material is formed by way of SSLE, useful as a unique identification mark for an article or item.

In accordance with the present invention in a second aspect, a complex pattern within an at least partially optically transparent material is formed by way of SSLE, whereby the pattern includes a distribution or array of dots which can support the projection of holographic image, which is also known as covert laser readable (CLR) image or "hidden text", as because the projected image only appears under the illumination of laser of a certain wavelength from a certain angle. In such an embodiment, a holographic image may be projected.

In embodiments of the present invention, the first aspect and the second aspect may be used in combination. Further, in embodiments, when the pattern of the second aspect is formed, the marking of the first aspect is formed as a result of the formation of the pattern of the second aspect.

In order to provide such a marking, the present invention utilises the technique subsurface laser engraving (SSLE) in order to form an irreproducible pattern, which can be produced beneath the surface of the at least partially optically transparent material.

The present invention avails itself of the imperfect nature of an at least partially optically transparent material, whereby random defects will be generated within the material during the SSLE process, where the appearance and position of these defects is unpredictable and unrepeatable.

Regardless of whether a same batch material or adjacent portions of a material are utilised, due to the imperfect nature of the material, even if a same marking routine is utilised when using SSLE, such as the writing of an identical indicia, the defects formed in the material will be different every time.

As such, a unique and irreproducible pattern or arrangement of defects produced by SSLE in accordance with the present invention provides a unique identification marking which may be validated by way of comparison with data which has previously been acquired which is reflective of the pattern or arrangement of defects within the material.

In order for validation and authentication of the marking, an optical image is captured or acquired whereby the defects are optically identifiable without the necessity of specialized lighting or illumination apparatus or particular wavelengths, which may be captures at low magnification or without magnification by way of an optical acquisition device such as a digital camera or the like. The captured or acquired image is then compared by way of a processor with that as previously captured or acquired, and validation and hence authentication can thereby be determined.

In embodiments of the invention, the marking may be formed within a material which then may be utilised in an identification item which may be attached or associated with an article or goods.

Alternatively, the marking may be directly written into an article when the article has at least a portion thereof formed from a suitable at least partially optically transparent material.

In other embodiments, the marking formed by the creation of defects is formed when a unique optically identifiable indicia such as a serial number or other indicia such as a bar code or a QR code is written within the material.

The unique optically identifiable indicia may be utilised in conjunction with the marking formed by the defects as a result of the formation of the indicia, for identification and validation. Alternatively, the optically identifiable indicia may not be unique, however regardless the marking formed by way of the defects will be irreproducible. As will be understood, even in the event counterfeit or emulation of the optically identifiable indicia, whether or not unique, the marking formed by the defects will be unique and thus upon seeking validation and authentication such a marling or item will be identified as being non-authentic.

In alternate embodiments, the item to which the marking is applied may be card type device, such as an identification card, a validation card or a credit card, which includes a portion thereof, which is at least partially optically transparent from a first side of the item to the other side of the item such that light may travel therethrough.

A pattern may be formed including dots array can support the projection of holographic image, which is also known as covert laser readable (CLR) image or "hidden text", as the projected image only appears under the illumination of laser of a certain wavelength from a certain angle. The pattern is formed within the material by way of SSLE in accordance with the invention.

In such an embodiment, in order for such a holographic image to be projected, a laser light source at an appropriate angle of incidence is applied to a first side of the item and through the item, and then exits a second side of the item towards a viewing panel such that the requisite holographic image is projected on the viewing panel. The computation of the CLR image is a challenging and complex mathematical process, and also provides a security due to the technical barrier to counterfeit an item having such a CLR causing difficulty in emulation.

It should be noted, a CLR pattern typically cannot be identified with the naked eye, however it can be optically identified optically provided suitable optical magnification is utilized. For example, the dot size or line width is typically of the order of several microns, which is not identifiable to the naked eye.

The predetermined projected image be recorded in the database and can be easily accessed via the modern communication technology, for example, by cell phone, wireless device, peripheral devices in conjunction with a device, readers and wireless internet or the like. The authentication process can be carried out by the comparison between the projected image the images stored in the database. Authentication and validation systems as existing in the art may be used in conjunction with the present invention.

In such an embodiment, the formation of the pattern also forms an irregular and irreproducible distribution of defects within the material as described above, which can be optically identified and validated and authenticated as above. Accordingly, the irregular and irreproducible distribution of defects, in combination with pattern which provides for projection of a holographic image, provides additional difficulty for counterfeiting, thus providing enhanced security.

Thus, the identifier comprising patterns combining the CLR image and randomness in the SSLE process is ideal for security purposes.

The fundamental principle of SSLE as utilised in the present invention, is the nonlinear multi-photon absorption process, which places a high requirement on the laser power control to produce the ideal and controllable results.

Moreover, the fact that a material is not fully homogenous throughout, makes it impossible to control laser power so precisely to produce the patterns exactly the same as the computer-generated dots array image such as for a CLR holographic image. As such and inherently, such an image or indicia is inherently irreproducible, which provides for a unique marking in its own right which can be used for identification and authentication purposes, including by way of image analysis, in accordance with the present invention.

Materials suitable for utilization in the present invention, include for example polymeric materials such as polypropylene (PP), polycarbonate (PC), polyvinylchloride (PV), Polyethylene terephthalate (PET) and the like. Upon writing being performed by subsurface laser engraving (SSLE), for the writing of an indicia within a material, local alterations caused by carbonization due to high energy laser pulses the result of which forms "dots" or elements of a CLR, for example a holographic image.

However, due to non-homogeneity of the material, defects are formed inadvertently during the process, which may be optically identifiable and the placement thereof is uncontrollable due to the variation in material structure. In such cases, small inadvertently caused dots may become joined so as to cause the defects and a distribution thereof due to non-linear absorption as a result of excessive absorption, resulting in a unique identifiable marking, which is utilised for identification and authentication purposes in accordance with the present invention.

Other materials applicable to the present invention include crystalline materials such a sapphire, in which discontinuities in the crystalline lattice may be randomly formed, which are suitable for a unique marking in accordance with the present invention.

Glass may also be used as a material in accordance with the present invention, wherein upon writing by SSLE, due to material structure inhomogeneity, localized defects are caused which cause changes in refractive index within the glass, resulting in an irreproducible arrangement of defects useful as a marking according to the invention.

Figure 1:
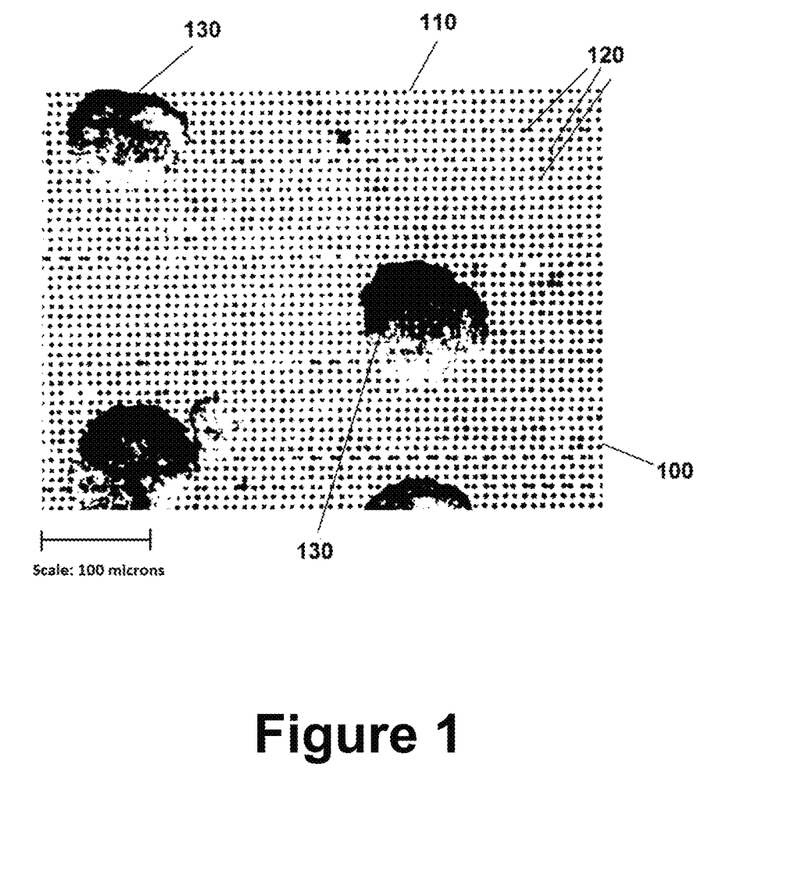
FIG. 1 shows a magnified optical photographic representation of an example of an optically transparent polymeric film material in accordance with the present invention.

In accordance with the present invention, the manner in which a marking is formed is described with reference to FIG. 1, whereby there is shown a magnified optical photographic representation of an example of an optically transparent polymeric film material 100, in which a marking has been formed by way of subsurface laser engraving (SSLE). In the present example, a matrix 110 is formed by a plurality of dots 120, the dots 120 having a period of 8 microns and the dots 120 having a diameter of about 2 microns. As such, a covert laser readable (CLR) pattern in the form of the matrix 110 which cannot be identified with the naked eye due to the dots 120 being too small, and which may be optically identified provided suitable optical magnification is utilized.

In the present example, the polymeric film material 100 is formed from is polypropylene, having a thickness of approximately 1.5 mm.

As is shown, defects 130 are formed in the material 100, which in the present example is due local alterations caused by carbonization due to high energy laser pulses, the result of which forms from the formation of the dots 120 of the CLR pattern.

The defects 130, as will be observed, are irregular and are formed inherently due to materials properties and inhomogeneities, and are irreproducible even if a same batch of material is used and the same pattern is used. Such defects are optically detectable with the naked eye or under optical magnification, and provide a unique pattern by way of the irreproducible geometric arrangement.

As will be noted, even when a uniform CLE is formed such as the matrix 110 of the present example, with constant period and dot size, defects 130 occur in an unpredictable manner.

In accordance with the present invention, the formation of the unique distribution of defects 130 forms a unique and irreproducible marking.

An image of such a marking can be acquired by way of an optical acquisition device, such as a digital camera or the like, whereby the image may be stored in a database or data store for subsequent comparison with a later acquired image of the marking, for validation and authentication purposes.

Accordingly, the present invention provides for the formation of a unique an irreproducible marking, for security purposes.

The CLE created when forming the defects which form the marking, may also be used for identification and validation purposes, in conjunction with the irreproducible marking.

As is discussed below, in other aspects of the invention, a holographic image may be formed within the material, which may be used either alone as an identification means, or in combination with defects caused when forming the holographic image.

Figure 2A:
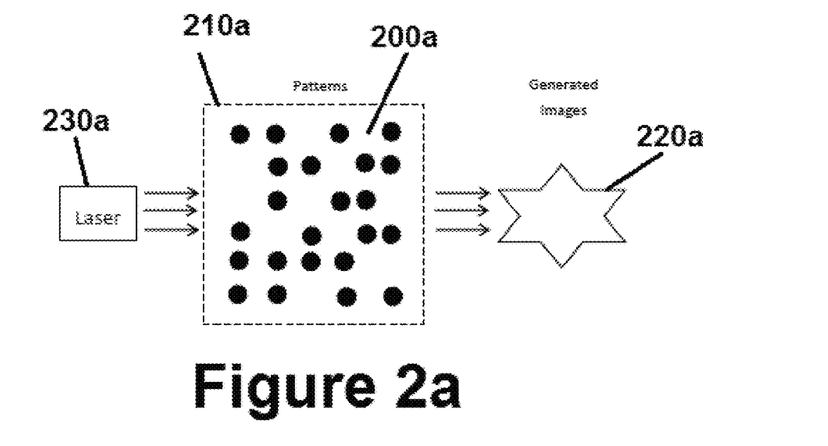
FIG. 2a provides a schematic illustration of the patterns in an identifier and a generated holographic image under the laser illumination, and FIGS. 2b through 2c provide schematic illustrations that of different patterns producing different holographic images as in FIGS. 2a and 2b, or same holographic image as in FIGS. 2b and 2c.
Figure 2B:
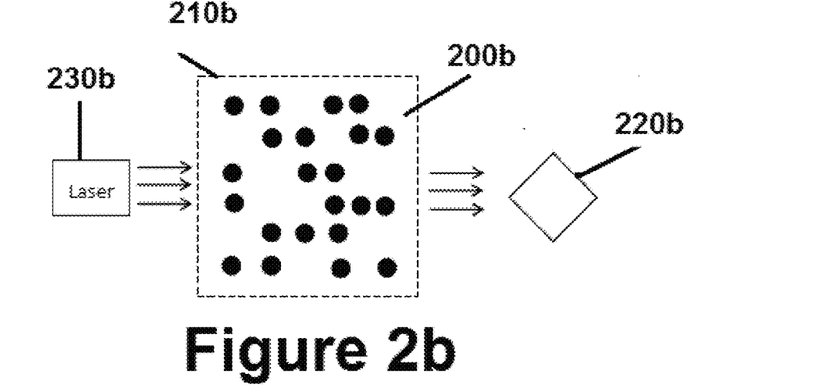
Figure 2C:
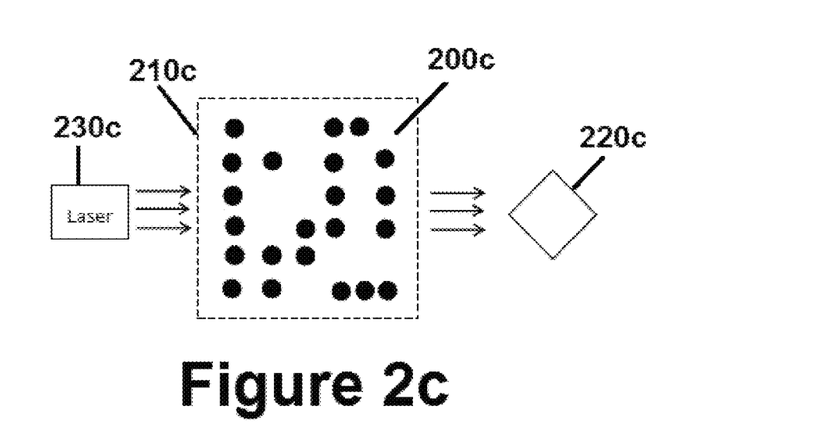

By way of example and referring to the schematic representations FIGS. 2a to 2c, an array of dots is used as an example of the pattern of the identifier or indicia as a CLR 200a, 200b, 200c, suitable for projection as a holographic CLR image 220a, 220b, 220c formed in a material 210a, 210b, 210c from SSLE, in accordance with the present invention.

As is illustrated schematically that under the laser illumination 230a, 230b, 230c, the CLR image 220a, 220b, 220c is projected. As illustrated by FIGS. 2a and 2b, by using different patterns 200a, 200b, different CLR image 220a, 220b can be projected. It is possible to generate different patterns 200b, 200c which project the same CLR image 220b, 220c and this is illustrated schematically by FIGS. 2b and 2c.

The generation of CLR image is a highly complex mathematical process which is highly dependent on the algorithm utilised. Thus, it is theoretically impossible to generate the same patterns by using different algorithms and therefore, as long as the algorithm utilized is maintained as confidential, it is impossible to duplicate the patterns.

Figure 3A:
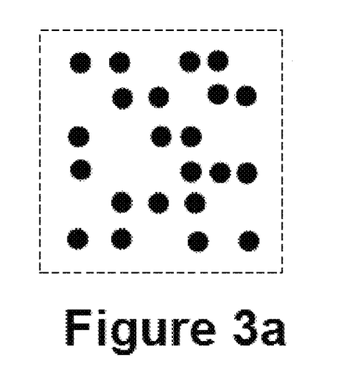
FIGS. 3a to 3e provide schematic illustrations of examples shapes of patterns, regular or irregular, when used for marking in accordance with the present invention.
Figure 3B:
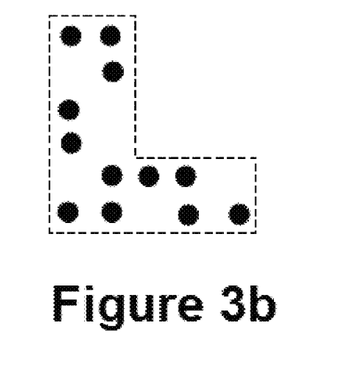
Figure 3C:
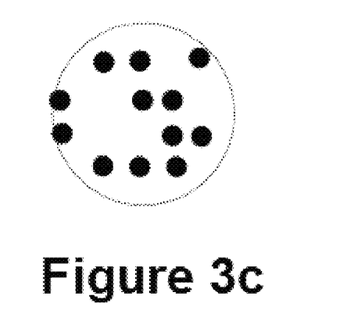
Figure 3D:
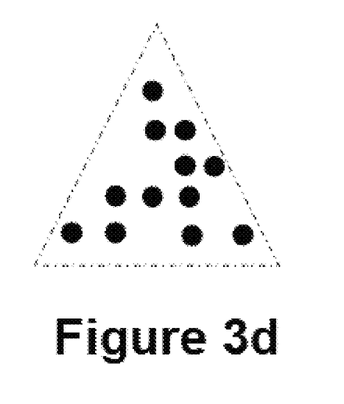
Figure 3E:
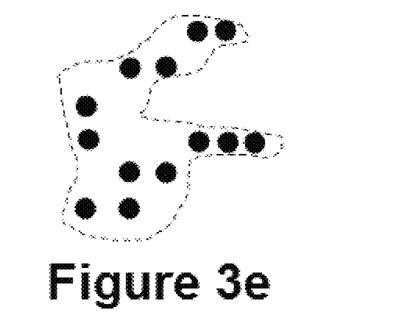

To be able to project a CLR image, there is a limit on the smallest area. The projected CLR image will not be influenced as long as the pattern is larger than that limit. Therefore, firstly, there are no restrictions on the shape of the pattern, as it can be regular, for example, square, as illustrated in FIG. 3a, a geometrically defined perimeter as in FIG. 3b, circular as in FIG. 3c, triangular as in FIG. 3d or irregular, for example, the freeform as illustrated in FIG. 3e.

Figure 4A:
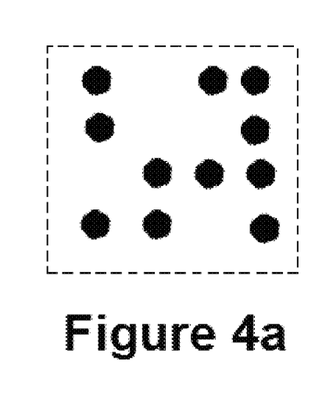
FIGS. 4a and 4b provides a schematic illustration of CLE images.
Figure 4B:
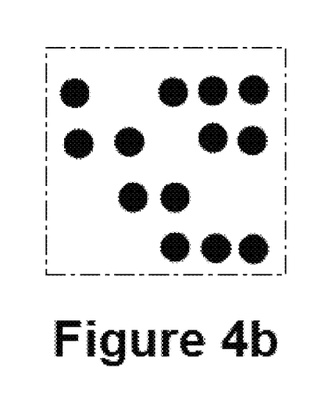
Figure 4C:
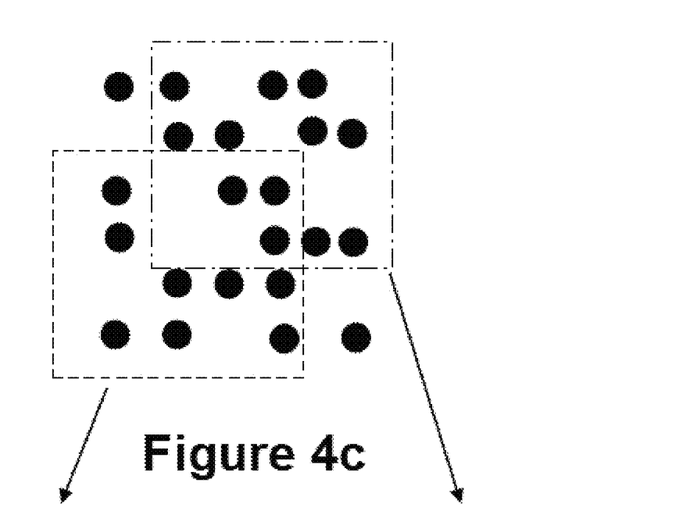
FIG. 4c depicts the images of FIGS. 4a and 4b respectively including defects.

Secondly the pattern in the marking can be a part of a larger-size dots array. As illustrated by FIGS. 4a and 4b, two patterns selected from different portion of a dots array of FIG. 4c appear different from each other but theoretically will project the same CLR image under the laser illumination.

In order to increase the security level for security purposes, randomness can be incorporated into the selection process, which means the selection of a certain portion of a larger-size dots array can be determined by a random process.

With the proper records maintained, only a manufacturer or authorized entity will know correspondence between the pattern in the identifier, and the position of the certain portion in the larger-size dots array. Accordingly, the level of security can be elevated in this regard.

Figure 5A:
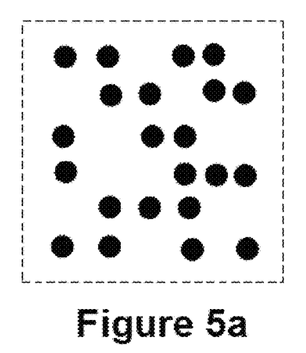
FIGS. 5a to 5d provide schematic illustrations of examples of defects as utilized in the present invention as markings.
Figure 5B:
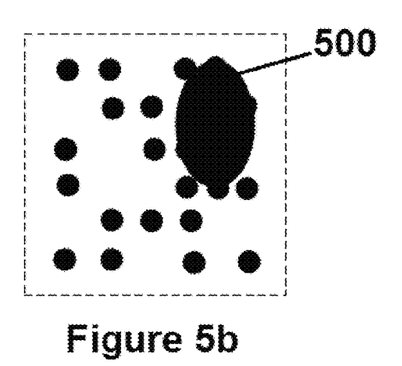
Figure 5C:
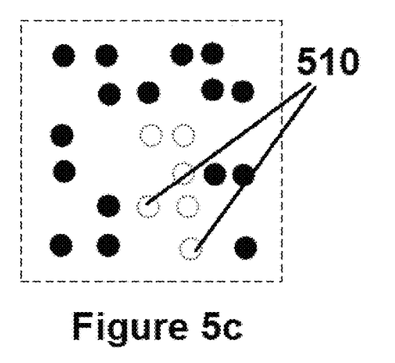
Figure 5D:
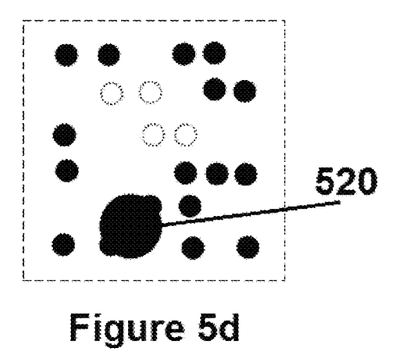

In FIGS. 5a to 5d, the possible defects are illustrated schematically. FIG. 5a depicts an ideal or requisite pattern; in FIG. 5(b) during the SSLE process, the power is too strong or the material is weak or defected at the certain part of the material, which result in the burn-out or extra-large dots 500 and 520. In FIG. 5c, during the SSLE process, when the power is too weak or insufficient, or the material is too strong at the certain part of the material which result in the missing dots 510; and in FIG. 5d during the SSLE process, the burn-out and missing some dots can occur on the same object.

As opposed to the normal dots in the array, these defects 500, 520, can be much larger which may be observed by using low magnification magnifier or even by naked eye, similarly as described with reference to FIG. 1 above. These random defects can occur as a result of the combined effect of process control and material property. In this case, even the original manufacturer or authorized entity, equipped with the generation algorithm, the process parameters and the source of material, is not able to reproduce the results and the result is that each marking is unique. Thus, the pattern of these defects can be readily observed and can also be utilized in anti-counterfeiting and validation applications.

Figure 6A:
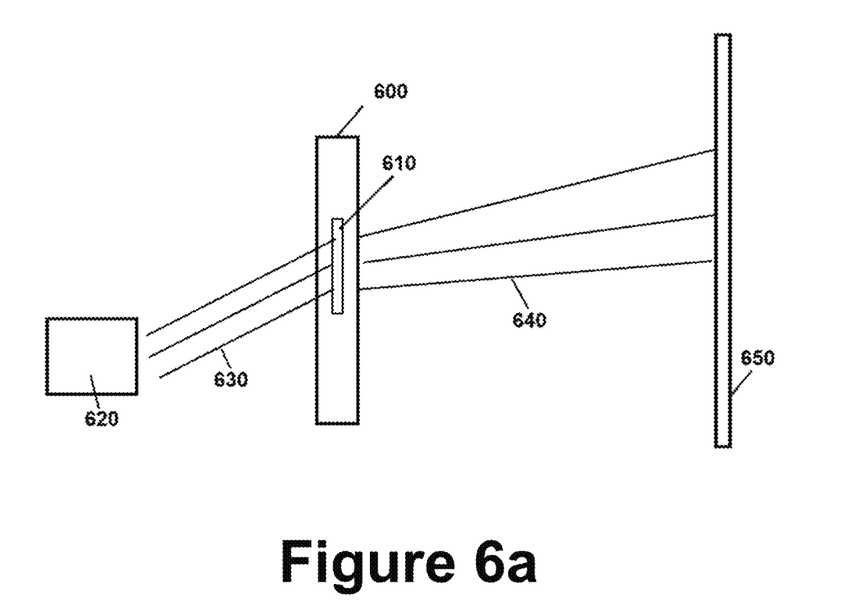
FIG. 6a depicts a schematic representation of the manner in which a holographic representation may be viewed in accordance with the present invention.

By way of example, referring to FIG. 6a, there is shown a schematic representation of the manner in which a holographic representation may be viewed in accordance with the present invention. Within an article 610 from an at least partially optically transparent material, a covert laser readable (CLR) image 610 is formed with by way of subsurface laser engraving (SSLE). In such a case, defects caused during the creation of the CLR, may or may not be utilised for security purposes, depending upon the application The CLR image 610 is an arrangement of dots for forming a holographic projectable image such that upon a laser light source 620 at an appropriate angle of incidence 630 being applied to a first side of the article 610 and through the at least partially optically transparent material, and the light 640 exiting a second side of the article through the at least partially optically transparent material towards a viewing panel, requisite holographic image is projected on the viewing panel 650.

Figure 6B:
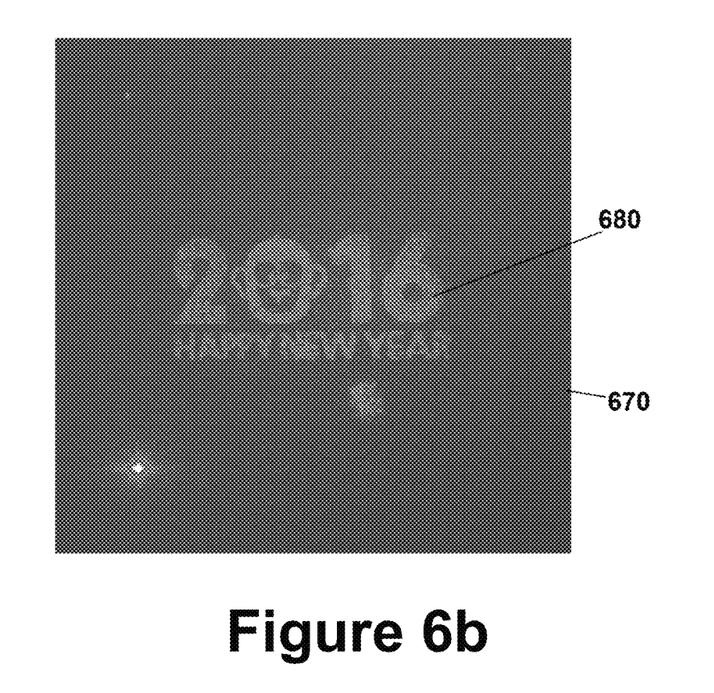
FIG. 6b shows a photographic representation of a projected holographic image from a marking according to the present invention.

Referring to FIG. 6b, there is shown a photographic representation 670 of a projected holographic image 680, whereby the CLR image has been formed within an article by the process of the present invention, and projected image is projected and viewed in a manner as described in reference to FIG. 6a.

Figure 7:
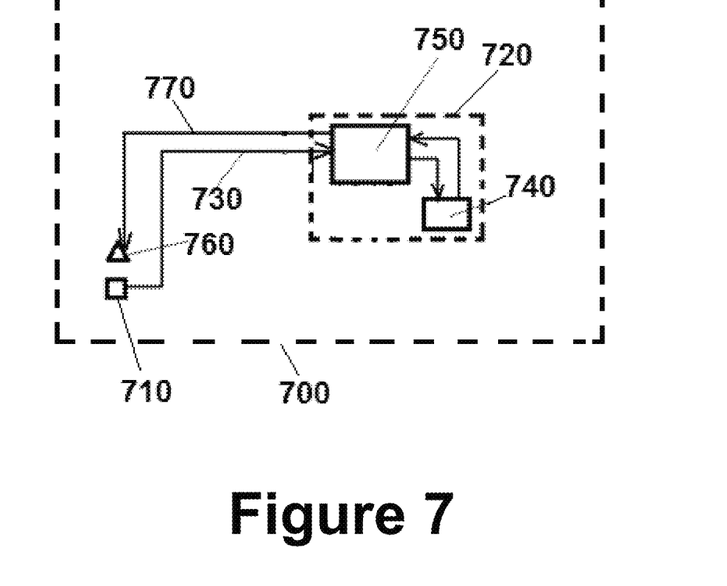
FIG. 7 shows a schematic representation of a validation and authentication system according to the present invention.

Referring to FIG. 7, there is show a schematic representation of a validation and authentication system 700 according to the present invention, whereby the validation and authentication system is for validating the authenticity of an article. Such an article includes a marking as provided by the present invention as described and claimed, whereby the marking includes a plurality of defects formed from subsurface laser engraving (SSLE) as described above including with reference to FIG. 1.

The validation and authentication system 700 includes a reader device 710 acquiring an optical image of a marking from an article.

The validation and authentication system 700 further includes a control system 720 in communication with the reader device 710 for receiving a signal 730 from the reader device 710 indicative of the optical image of the marking acquired from the article.

The control system 720 includes a data store having data 740 indicative of a correlation between the article and a pre-acquired optical image of the marking. The control system 720 includes a processor 750 for processing data received from the reader device 710 and from the data store 740.

The validation and authentication system 700 further includes an authentication indication device 760 for providing an indication that the acquired optical image of the marking correlates with the pre-acquired optical image of the marking.

Upon receipt of the signal 730 from the reader device 710 the processor 750 determines if the acquired optical image correlates with the pre-acquired optical image and in the event of a valid correlation, an authentication signal 770 is sent indicative of a correlation from the control system 720 to the authentication indication device 760.

Figure 8:
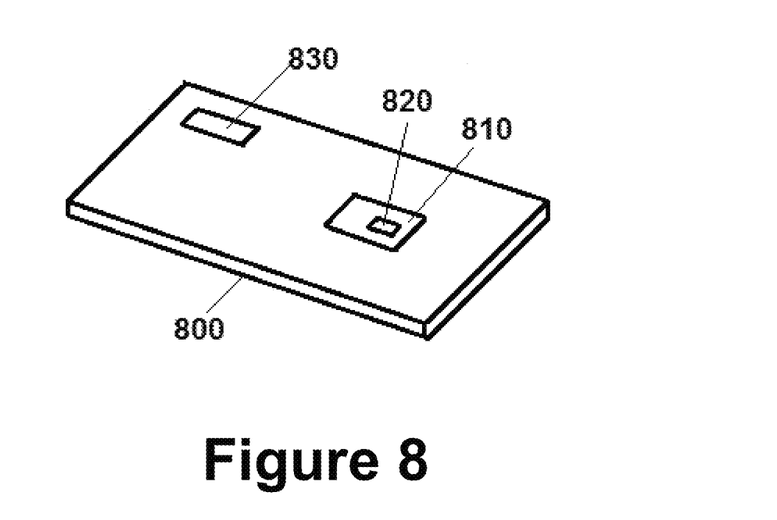
FIG. 8 shows a schematic representation of an example of an article in accordance with the present invention.

Referring to FIG. 8, there is shown a schematic representation of an example of an article in accordance with the present invention. Such an article may be used with the system as shown in and described with reference to FIG. 7.

In the present example, the article is a card type device 800, a portion of which includes an at least partially optically transparent material 810 in which a marking is formed by way of subsurface laser engraving (SSLE). In such an example, the marking may be random defects formed by the writing of a CLR image, a CLR indicia or a holographic projectable image, or combinations thereof. The card 800 may further include a further identification element, which may be a serial number, name, indicia or the like, or combinations thereof, and may further include a RF (Radio Frequency) or NFC (Near Field Communications) element therein.

As will be appreciated, the card 800 may be an identification card, a credit card, an access card or the like, whereby the inclusion of the marking 820 of the present invention provides for security against counterfeiting.

In other embodiments of the invention, the card may be utilized as an ownership key, and ownership or custody of another article, such as jewellery, which may be associated with the card.

For example, upon purchase of a piece of jewellery or other goods, the particulars of the piece of jewellery, which may already be within a database and have information associated with the article jewellery such as authentication and origin and history documents, may then be associated with the unique marking 820 which is identified with a customer whose personal details 830 may be also stored in association with the unique marking 820. As will be understood, more than one jewellery or other article may be associated with the unique card 800.

By providing such a non-reproducible marking, protection against theft of personal data and information is increased, as such a marking cannot be reproduced.

In other embodiments, the marking can be provided as a tag or label, which may be temporarily or permanently affixed to an article. However, in other embodiments, the marking may be formed within the actual article, such as within a polymeric or glass material for example a bottle or the like, providing security against counterfeiting.

The size of the pattern of the marking depends on the application, and as well may be influenced by cost. The pattern should be larger than the spot size of the laser that will be used to "read" the pattern. Typically, the pattern should be greater than 0.5 mm in diameter. The upper limit of the pattern depends on the cost concerns, whereby the larger the pattern, the longer the process time, thus the higher cost for production.

When marking an article according to the present invention, laser may be used to write the pattern or marking, such as a picosecond laser, or a femtosecond laser. A shorter pulse width is preferred in order to write the requisite pattern. In accordance with above examples, the pulse width utilized was is smaller than 15 picosecond.

What is claimed is:

1. A process of forming an identification marking within article formed from an at least partially optically transparent material for identification and validation, said process including the steps of:
   (i) forming an indicia within an at least partially optically transparent material by way of subsurface laser engraving (SSLE); and
   (ii) forming a plurality of defects within or adjacent said indicia within said at least partially optically transparent material resultant of the step of forming the indicia and from localized heating and irregularities in said at least partially optically transparent material;
   wherein said plurality of defects forms said identification marking.

2. A process according to claim 1, wherein said at least partially optically transparent material is a polymeric material.

3. A process according to claim 1, wherein said at least partially optically transparent material is a crystalline material.

4. A process according to claim 1, wherein said at least partially optically transparent material is a non-crystalline amorphous solid material.

5. A process according to claim 4, wherein the non-crystalline amorphous solid material is a silicate glass.

6. A process according to claim 1, wherein the indicia is a covert laser readable (CLR) image.

7. A process according to claim 1, wherein the indicia is a covert laser readable (CLR) image with an at least partially optically transparent material by way of subsurface laser engraving (SSLE), and wherein the CLR image provides holographic projectable image such that upon a laser light source at an appropriate angle of incidence being applied to a first side of the article and through the at least partially optically transparent material, and the light exiting a second side of the article through the at least partially optically transparent material towards a viewing panel, requisite holographic image is projected on the viewing panel.

8. An article including therein an identification marking therein, wherein the identification marking is formed according to the process of claim 1.

9. An article according to claim 8, wherein at least a portion of the article is formed from a suitable at least partially optically transparent material.

10. An article according to claim 8, wherein the article is a card-type article including those selected from the group including an access card, an identification card, a smart card, a credit card or the like.

11. An article according to claim 8, wherein the article is an identification device including those selected from the group including an identification tag, a label, a certification tag or the like.

12. An article according to claim 8, wherein the marking is formed within the body of the article.

13. An article according to claim 8, wherein the marking is formed within the body of the article and wherein the article is a vessel, bottle, container or the like.

14. A process of validating and authenticating a marking, said process including the steps of:
 (i) acquiring an optical image from an article of a marking formed within the article and formed according to the process of claim 1, by way of an optical acquisition device;
 (ii) comparing the optical image with a pre-acquired optical image of said marking by way of a processor; and
 (iii) upon the processor determining a correlation between the acquired image of the marking with the pre-acquired optical image of the marketing, the processor provides a signal indicative of authentication of the marking.

15. A validation system for validating the authenticity of an article, said validation system comprising:
 a reader device acquiring an optical image of a marking from an article, wherein the marking comprises a plurality of defects formed within the article by the process according to claim 1;
 a control system in communication with the reader device for receiving a signal from the reader device indicative of the optical image of the marking acquired from the article, said control system including a data store having data indicative of a pre-acquired optical image of the marking; the control system further including a processor for processing data received from the reader device and from the data store; and
 an authentication indication device for providing an indication that the acquired optical image of the marking correlates with the pre-acquired optical image of the marking;
 wherein upon receipt of said signal from the reader device the processor determines if the acquired optical image correlates with the pre-acquired optical image and in the event of a valid correlation an authentication signal is sent indicative of a correlation from the control system to the authentication indication device.

16. A process of forming an identifiable marking to an article within an at least partially optically transparent material for identification and validation, said process including the step of:
 (i) forming a covert laser readable (CLR) image with an at least partially optically transparent material by way of subsurface laser engraving (SSLE);
 wherein the CLR image provides holographic projectable image such that upon a laser light source at an appropriate angle of incidence being applied to a first side of the article and through the at least partially optically transparent material, and the light exiting a second side of the article through the at least partially optically transparent material towards a viewing panel, requisite holographic image is projected on the viewing panel.

17. A process according to claim 16, wherein the subsurface laser engraving (SSLE) forms a plurality of defects within or adjacent indicia within said at least partially optically transparent material resultant of localized heating and irregularities in said at least partially optically transparent material; and wherein said plurality of defects forms an optically identifiable marking.

18. An article having an identifiable marking formed according to the process of claim 16, wherein the article is article is a card-type article including those selected from the group including an access card, an identification card, a smart card, a credit card or the like, an identification device including those selected from the group including an identification tag, a label, a certification tag or the like, or a vessel, bottle, container or the like.

19. An article according to claim 18, further including an optically identifiable marking formed according to claim 1.

20. A validation system for validating the authenticity of an article, said validation system comprising:
 a reader device acquiring an optical image of a marking from an article, wherein the marking comprises a plurality of defects formed within the article by the process according to claim 16;
 a control system in communication with the reader device for receiving a signal from the reader device indicative of the optical image of the marking acquired from the article, said control system including a data store having data indicative of a pre-acquired optical image of the marking; the control system further including a processor for processing data received from the reader device and from the data store; and
 an authentication indication device for providing an indication that the acquired optical image of the marking correlates with the pre-acquired optical image of the marking;
 wherein upon receipt of said signal from the reader device the processor determines if the acquired optical image correlates with the pre-acquired optical image and in the event of a valid correlation an authentication signal is sent indicative of a correlation from the control system to the authentication indication device.

\* \* \* \* \*